Sept. 4, 1951 R. GROSSE 2,566,609
HYDRAULIC SAFETY VALVE
Filed June 20, 1947
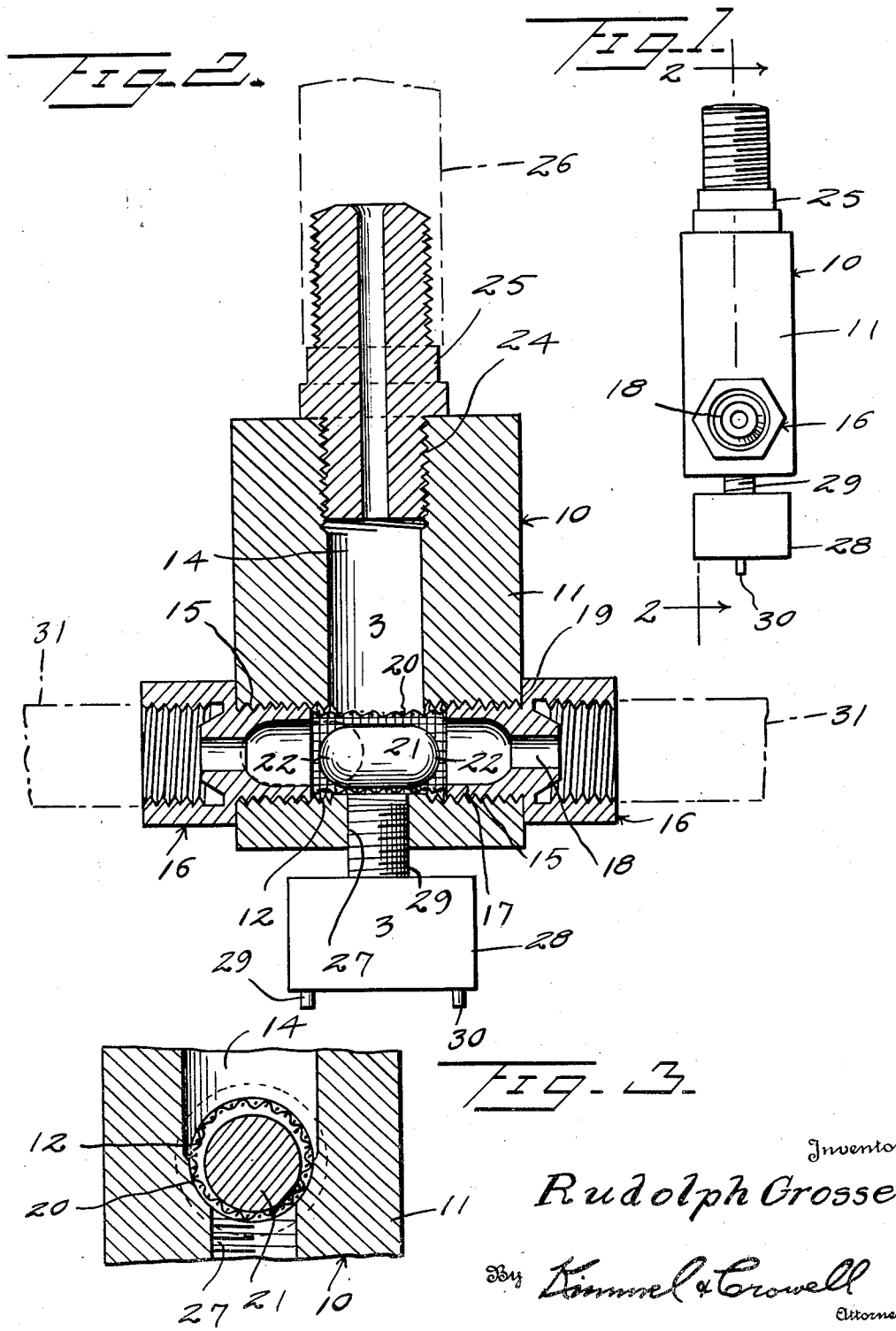

Patented Sept. 4, 1951

2,566,609

UNITED STATES PATENT OFFICE 2,566,609

HYDRAULIC SAFETY VALVE

Rudolph Grosse, Jacksonville, Fla.

Application June 20, 1947, Serial No. 756,000

1 Claim. (Cl. 251—118)

This invention relates to hydraulic valves, and more particularly to a pressure operated safety valve for use with the hydraulic brakes of an automobile or other vehicle.

It is an object of this invention to provide an improved pressure actuated hydraulic shut-off valve for connection between the master cylinder of a hydraulic brake system and the wheel brakes. The valve is so constructed and arranged that a break or excessive leak in the line from the valve to a brake will cause the valve to shut off the flow of fluid to either the front or rear brakes. Rather than close the supply to one brake, it is preferred to close the supply to a pair of wheels so that an even braking force will be had by the vehicle either at the front or rear wheels. In this manner the sudden swerving caused by uneven braking on opposite sides of the car will be avoided.

Another object of this invention is to provide an improved hydraulic valve of this kind which is very simple in construction. The valve is formed with but one moving part, actuated by the pressure of fluid through the valve housing. There is no necessity of adjustment, and as the tolerances of fitting are very large, there is little cause for wear of the parts.

Still another object of this invention is to provide a valve of this kind having a screen about the opening from the master cylinder to exclude from the valve and connected lines any foreign particles or sediment which might accumulate in the master cylinder and from the reservoir.

A further object of this invention is to provide a valve of this kind for preventing excess oil from escaping from a broken hydraulic line. An excessive amount of oil escaping from one broken line would dissipate all the oil from the brake system rendering the entire system inoperative, and by the use of this valve, only that defective line and its associated parts are cut out from the system leaving the remainder operative.

With the above and other objects in view, my invention consists in the arrangement, combination and details of construction disclosed in the drawings and specification, and then more particularly pointed out in the appended claim.

In the drawing,

Figure 1 is a side elevation of a hydraulic safety valve constructed according to an embodiment of this invention, Figure 2 is a vertical section taken on the line 2—2 of Figure 1, Figure 3 is a fragmentary transverse section taken on the line 3—3 of Figure 2.

Referring to the drawing, the numeral 10 designates generally a body of a hydraulic safety valve for use in the brake system of an automobile or other vehicle for shutting off the flow of hydraulic fluid to certain brake lines upon the failure of those lines.

The brake valve 10 is adapted to be disposed between the master cylinder of the hydraulic system and the cylinders of the wheels. The valve 10 is adapted to be connected between the front and rear wheels. The two brake lines connecting the rear wheels are connected to one port of the valve 10, and the brake lines from the front wheels are connected to the other port. In this manner the failure of one of the rear brake lines will result in the closing of the valve to prevent the flow of fluid or pressure by applying either of the rear brakes. The same arrangement applies to the front brakes so that the failure of one of the front brake lines will result in the stopping of fluid pressure to both of the front wheels. In this manner the loss of fluid is prevented, upon the failure of one brake line and application of the brakes after the failure of one brake line will result in an even application of pressure to at least a pair of wheels, one on each side of the car. Since the brakes are applied evenly the swerving of the automobile due to an uneven application on either side will be avoided.

The safety valve 10 is formed of a rectangular metal block 11, having intake and outlet ports formed therein. The block 11 is formed with a transverse bore 12 near one end thereof, and with a right angularly disposed vertically extending bore 14 which communicates with the bore 12 intermediate the length thereof. Both ends of the bore 12 are threaded as at 15, and a connector fitting 16 is adapted to be engaged with the threads 15.

The fittings 16 are each formed with a reduced diameter inner end 17 threadably engaging with the bore 12 and threads 15. The fitting 16 is enlarged at the outer end and threaded internally for the connection of the fluid lines to the wheels. The inside of the reduced diameter end of the fitting 16 is formed with a further reduced diameter opening 18 which extends outwardly from the valve seat 19 formed on the inner end of the reduced diameter portion 17.

The valve seats 19 are rounded and faced inwardly of the bore 12 and block 11. The inner ends of the fittings 16 are spaced apart in the block 11 by at least the diameter of the inlet opening or bore 14. A cylindrical screen or filter element 20 is disposed within the bore 12 between the inner ends of the fittings 16. The outer ends of the screen 20 abut the inner ends of the fittings 16 to prevent any sliding movement of the screen 20 in the valve 10. A sliding plug 21 is disposed within the transverse bore 12 for alternately or selectively seating in the valve seats 19 of either one of the fittings 16.

The outer ends of the plug 21 are rounded as at 22 to conform to the shape of the valve seats 19. The plug 21 is of a smaller diameter than the diameter of the bore 12 and less than the internal diameter of the screen 20 so that fluid may normally flow freely about the plug 20 and outwardly through the fittings 16. The ends 22 are so shaped that the plug 21 will sealingly engage in the valve seat 19 when the plug 21 is moved outwardly by the flow of liquid in one direction due to the drop of pressure in the broken connecting line.

The bore 14 is threaded internally at its upper end as at 24, and a connector fitting 25 is engaged with the threads 24 for connecting a line as 26 to the master cylinder. An extension of the bore 14 is provided beyond the intersection of the bores 14 and 12 as designated by the numeral 27. The bore 27 extends downwardly from the bore 14 through the block 11. A pressure responsive switch 28 is connected to the bore 27 by a suitable connecting means or fittings 29. The switch 28 is provided with contacts 29 and 30 for connection with the electrical circuit to the brake lights.

In the use and operation of this valve 10, the line 26 connects between the valve 10 and the master cylinder of the brake system. The bore 14 provides an inlet port for the hydraulic fluid. The fittings 16 are connected to hydraulic lines 31 which extend to the wheel brakes. Upon application of pressure to the master cylinder, hydraulic pressure is applied through the valve 10. This pressure will actuate the switch 28 for completing the circuit to the brake lights. The pressure and flow of fluid through both of the fittings 16 will be the same so that the plug 21 will remain substantially between the inner end of the fittings 16. Upon the failure of one of the hydraulic lines, the pressure to that line will drop and the flow of liquid to that line will suddenly increase with a resulting decrease of pressure. The resulting pressure in the other hydraulic lines will act on the plug 21 for moving the plug toward the valve seat 19 and fitting 16 connected to the low pressure line. The remaining pressure in the system will hold the plug 21 in sealing engagement with the valve seat 19 so that a further loss of liquid will be prevented.

I do not mean to confine myself to the exact details of construction herein disclosed, but claim all variations falling within the purview of the appended claim.

What I claim is:

A hydraulic safety shut-off valve comprising a body formed with a transverse bore therethrough, an outlet fitting engaged in the opposite ends of said bore, each of said fittings formed with an inwardly directed valve seat on the inner ends thereof, said body formed with an inlet passage communicating with said transverse bore at right angles thereto and intermediate the length thereof, a cylindrical strainer element in said bore coaxial therewith open at the ends thereof and extending across the opening of said inlet passage in said bore, and a cylindrical valve plug slidable in said strainer element having semi-spherical ends alternately engageable with said valve seats upon sliding of said plug to one end of said bore.

RUDOLPH GROSSE.

REFERENCES CITED

The following references are of record in the file of this patent:

UNITED STATES PATENTS

| Number | Name | Date |
|---|---|---|
| 820,146 | Simonds | May 8, 1906 |
| 883,337 | Peck | Mar. 31, 1908 |
| 966,150 | Woodbridge | Aug. 2, 1910 |
| 1,588,657 | Christensen | June 15, 1926 |
| 1,609,641 | Christensen | Dec. 7, 1926 |
| 1,664,680 | Hallett | Apr. 3, 1928 |
| 1,686,310 | Beebe | Oct. 5, 1928 |
| 1,782,758 | Gavin | Nov. 25, 1930 |
| 2,145,790 | Groves | Jan. 31, 1939 |
| 2,190,872 | George | Feb. 20, 1940 |
| 2,254,990 | Blank | Sept. 2, 1941 |
| 2,265,117 | Seymour | Dec. 2, 1941 |
| 2,322,658 | Overbeke | June 22, 1943 |
| 2,381,484 | Blank | Aug. 7, 1945 |
| 2,386,585 | Blank | Oct. 9, 1945 |

FOREIGN PATENTS

| Number | Country | Date |
|---|---|---|
| 333,365 | Great Britain | of 1930 |
| 349,520 | Great Britain | of 1931 |